Dec. 25, 1934.  E. J. KOCOUR  1,985,257

FLUSH VALVE

Filed July 1, 1931

Inventor
By Emil J. Kocour
Parker T Carter Attys.

Patented Dec. 25, 1934

1,985,257

UNITED STATES PATENT OFFICE 1,985,257

FLUSH VALVE

Emil J. Kocour, Chicago, Ill., assignor to Sloan Valve Company, Chicago, Ill., a corporation of Illinois Application July 1, 1931, Serial No. 548,151

7 Claims. (Cl. 137—93)

This invention relates to flush valves and has for its object to provide a new and improved device of this description. The invention has as a further object to provide a flush valve with means for varying the time of the cycle of operation of the flush valve. The invention has as a further object to provide a flush valve which can be adjusted for a long or short flush. The invention has further objects which are more particularly pointed out in the accompanying description.

Figure 1:
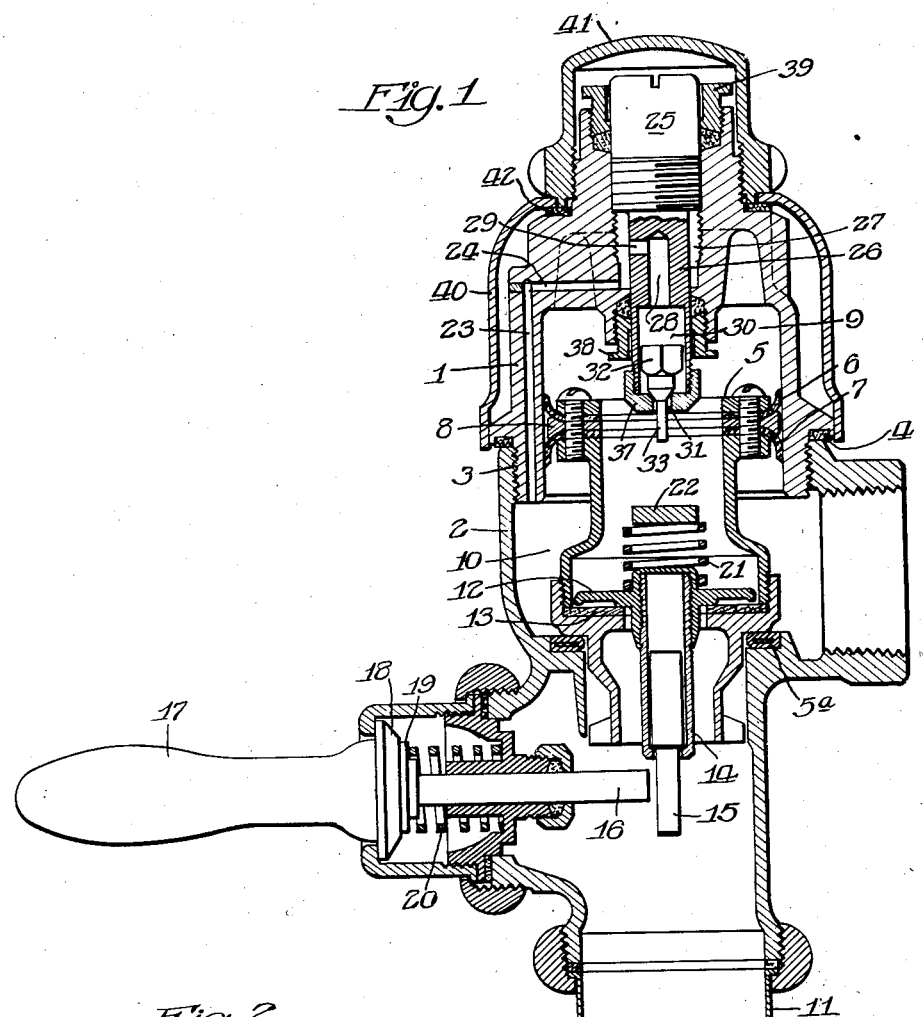
Figure 2:
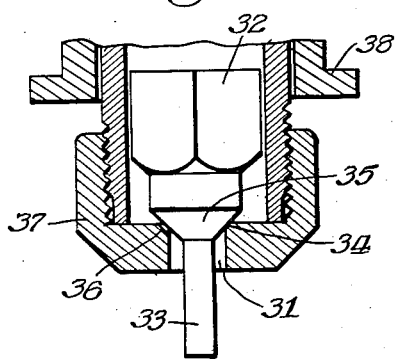
Figure 3:
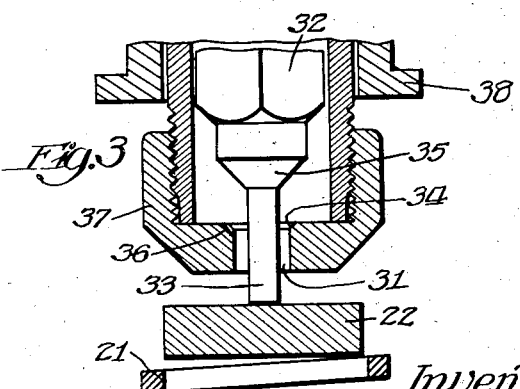

Referring now to the drawing, Fig. 1 is a sectional view through one form of valve embodying the invention;

Fig. 2 is an enlarged sectional view showing the bypass controller in its closed position; and Fig. 3 is a view similar to Fig. 2 showing the bypass controller in its open position.

Like numerals refer to like parts throughout the several figures.

Referring now to the drawing, there is illustrated a flush valve having a casing made up of the sections 1 and 2, removably connected together by means of a threaded connection 3, there being provided a packing 4 between the two sections when they are connected together.

Within the casing is a main valve 5, having the two cup leathers 6 and 7 with their edges bent in opposite directions, and with a separating member 8 between them having curved faces near the periphery thereof to insure the proper position of the peripheries of the cup leathers. The main valve divides the casing into two chambers, an upper chamber 9 and a lower chamber 10, and closes on the seat 5a. The main valve is hollow, and the upper chamber has a connection to the discharge pipe 11 through the main valve.

This connection is controlled by an auxiliary valve 12, which in this case is a tilting valve, and is mounted upon a seat 13. This valve is provided with a stem consisting of the members 14 and 15 slidably connected together. The auxiliary valve is actuated by the actuating member 16 which is moved toward the member 15 so as to tilt the valve from its seat and open the communication between the chamber 9 and the discharge 11. The actuating member is operated by means of a handle 17 arranged with an enlarged end 18 which engages the enlarged end 19 of the actuating member 16, so that when the handle is moved in any direction the member 16 is moved inwardly. A retracting spring 20 returns the parts to their initial position when the handle is released. The auxiliary valve 12 is provided with a retracting spring 21 which engages said valve and engages the part 22 on the main valve.

There is a bypass leading from the chamber 10 to the chamber 9. This bypass consists of the sections 23 and 24 in the section 1 of the casing. The casing is provided with an opening communicating with the exterior thereof and with the chamber 9. In this opening is a plug 25 which has a screw threaded engagement with the casing so as to be adjustable along the opening therein. This plug has a contracted portion 26 which does not fill the entire opening in the casing, leaving a chamber 27. The section 24 of the bypass connects with this chamber, as shown in Fig. 1, and the bypass is completed by this chamber 27 and a passageway 28 communicating with the chamber 27 by means of the passageway 29.

The passageway 28 has an enlargement 30 and a contracted portion 31 by means of which it communicates with the chamber 9 in the casing. Within the enlargement 30 is a bypass controller 32 which has at its end a pin 33 which projects through the contracted portion 31 of the bypass. The portion 31 of the bypass is preferably provided with an inclined face 34, and the bypass controller has an inclined face 35 which engages the inclined face 34 when the bypass controller is in its closed position.

Some means is provided for permitting a small amount of water to pass when the bypass controller is closed, and in the device herein shown this result is secured by providing a groove 36 in the inclined face 34. It will thus be seen that when the bypass controller is in its closed position, as shown in Fig. 2, a small amount of water can pass through this groove 36 so that water can pass through the bypass from the chamber 10 into the chamber 9.

In the construction shown the contracted opening 31 of the bypass passes through the cap 37 on the end of the section 26 of the plug. This plug is provided at its lower end with the packing member 38 and at its upper end with the packing member 39. It will be seen that the plug 25 may be made to project more or less into the chamber 9 by simply rotating it in one direction or the other. It will be seen that the part 22 of the main valve as it rises will engage the end 33 of the bypass controller 32 and lift the bypass controller from its seat, thus enlarging the opening 31. This permits a comparatively large volume of water to flow through the bypass into the chamber 9. At this time the auxiliary valve 12 is closed, and this enlargement of the bypass speeds up the filling of the chamber 9.

As the main valve moves down, the bypass controller 32 drops until the inclined face 35 thereof engages the inclined face 34 on the part 37. The bypass is then contracted to a very small opening, namely the groove 36, and the filling of the chamber 9 is thus slowed up. It will thus be seen that as the plug 25 is projected farther into the chamber 9, the time of movement of the main valve through its cycle will be decreased, and as this plug 25 is moved upwardly, the bypass controller will be lifted from its seat later in the movement of the main valve and the time of the cycle of operation will be increased.

The section 1 of the casing is provided with an outer jacket 40 which is held in position by the cap 41 having a screwthreaded connection with the casing. A packing member 42 is provided which is engaged both by the jacket 40 and the cap 41.

I claim:

1. A flush valve comprising a casing, a main valve dividing the casing into an upper chamber and a lower chamber, a bypass connecting the lower chamber with the upper chamber, a plug associated with the upper chamber, the bypass extending through the plug and having an enlarged portion therein and a contracted portion, a bypass controller in the enlarged portion of the bypass in the plug and seating on the plug at the end of the contracted portion of the bypass and having a projection which extends through the contracted portion and projects beyond the end of the plug, and an engaging part on the main valve which, when the main valve is moved a predetermined distance, engages the projecting portion of the bypass controller so as to lift it from its seat.

2. A flush valve comprising a casing, a main valve dividing the casing into an upper chamber and a lower chamber, a bypass in the casing and extending from the lower chamber to the upper chamber, said bypass having an enlargement and a contracted portion, a bypass controller in said enlargement which seats at the end of said contracted portion, means for adjusting said contracted portion vertically with relation to the casing, said bypass controller having a projecting part which projects into said upper chamber an auxiliary valve carried by said main valve, and a part on the main valve separate from said auxiliary valve, which engages the projection on the bypass controller when the main valve is moved upwardly a predetermined distance, and moves the bypass controller from its seat.

3. A flush valve comprising a casing, a main valve which divides the casing into an upper chamber and a lower chamber, a bypass in the casing connecting the lower chamber with the upper chamber, a normally seated bypass controlling device in said bypass the portion of the bypass in which said bypass controller is located being adjustable to vary the distance it projects into said upper chamber, and a fixed part on the main valve which engages the bypass controller and moves it from its seat when the main valve is moved upwardly a predetermined distance said bypass controller permitting the upward movement of said main valve while in engagement therewith.

4. A flush valve comprising a casing, a main valve which divides the casing into an upper chamber and a lower chamber, a bypass in the casing connecting the lower chamber with the upper chamber, a normally seated bypass controlling device in said bypass adjustable vertically while remaining seated, and a fixed part on the main valve which engages the bypass controller and moves it from its seat when the main valve is moved upwardly a predetermined distance said bypass controller permitting the upward movement of said main valve while in engagement therewith, the bypass controller seating by gravity when the main valve moves downwardly sufficiently to release it.

5. A flush valve comprising a casing, a main valve dividing the casing into an upper chamber and a lower chamber, a bypass in said casing having one end communicating with the lower chamber and the other end communicating with the upper chamber, an adjustable plug having its end projecting into the upper chamber and provided with a part of the bypass, means for maintaining this part of the bypass in communication with the rest of the bypass as the plug is adjusted, the bypass at the end of the plug being contracted, a bypass controller in this plug which seats at the end of the contracted portion of the bypass an auxiliary valve carried by said main valve, and means on the main valve separate from said auxiliary valve for engaging the bypass controller to lift it from its seat when the main valve moves up a predetermined distance.

6. A flush valve comprising a casing, a main valve dividing the casing into an upper chamber and a lower chamber, a bypass in said casing having one end communicating with the lower chamber and the other end communicating with the upper chamber, an adjustable plug adjustably connected with the casing and having its end projecting into the upper chamber and provided with an enlarged opening which forms a part of the bypass, a bypass controller in said enlarged opening in said plug, the plug having a contracted opening through which a portion of the bypass controller projects, a part on said main valve which engages the bypass controller as the valve moves to move it to open the bypass, the main valve free to move a predetermined distance after it engages the bypass controller, and a portion on the end of said adjustable plug which also engages the part on the main valve to limit the upward movement thereof after the bypass controller has been moved a predetermined distance.

7. A flush valve comprising a casing, a main valve dividing the casing into an upper chamber and a lower chamber, a bypass in said casing having one end communicating with the lower chamber and the other end communicating with the upper chamber, an adjustable plug adjustably connected with the casing and having its end projecting into the upper chamber and provided with an enlarged opening which forms a part of the bypass, a bypass controller in said enlarged opening in said plug, the plug having a contracted opening through which a portion of the bypass controller projects, a part on said main valve which engages the bypass controller as the valve moves to move it to open the bypass, the main valve free to move a predetermined distance after it engages the bypass controller, and a portion on the end of said adjustable plug which also engages the part on the main valve to limit the upward movement thereof after the bypass controller has been moved a predetermined distance, the main valve being recessed at its upper end to receive the ends of said plug and said bypass controller.

EMIL J. KOCOUR.